United States Patent [19]

Arzoumanidis et al.

[11] 4,142,991

[45] Mar. 6, 1979

[54] SUBSTANTIALLY AGGLOMERATION-FREE CATALYST COMPONENT

[75] Inventors: Gregory G. Arzoumanidis; Richard F. Gold, both of Stamford, Conn.; Christian G. Michel, Ossining, N.Y.

[73] Assignee: Stauffer Chemical Company, Westport, Conn.

[21] Appl. No.: 739,896

[22] Filed: Nov. 8, 1976

Related U.S. Application Data

[63] Continuation-in-part of Ser. No. 643,438, Dec. 22, 1975, abandoned.

[51] Int. Cl.$^2$ .................................. C08F 4/64
[52] U.S. Cl. ........................ 252/429 B; 526/115; 526/116; 526/124; 526/125; 526/128; 526/129; 526/132; 526/139; 526/140; 526/141; 526/142; 526/159
[58] Field of Search ........................... 252/429 B, 441

[56] References Cited

U.S. PATENT DOCUMENTS

| | | | |
|---|---|---|---|
| 2,981,725 | 4/1961 | Lufy et al. | 252/429 B |
| 3,048,571 | 8/1962 | Stron et al. | 252/429 B |
| 3,219,651 | 11/1965 | Hill et al. | 252/429 B |
| 3,245,975 | 4/1966 | Zelinski | 252/429 B |
| 3,303,175 | 2/1967 | Achon | 252/429 B |
| 3,317,499 | 5/1967 | Nakagushi et al. | 252/429 B |
| 3,342,793 | 9/1967 | Palvarini et al. | 252/429 B |
| 3,639,375 | 2/1972 | Staiger et al. | 252/429 B X |
| 3,644,320 | 2/1972 | Sugiura et al. | 252/429 B |
| 3,701,763 | 10/1972 | Wada et al. | 252/429 B |
| 3,766,160 | 10/1973 | Caunt | 252/429 B |

FOREIGN PATENT DOCUMENTS 2342200  3/1974  Fed. Rep. of Germany.

*Primary Examiner*—Patrick Garvin
*Attorney, Agent, or Firm*—Michael E. Zall

[57] ABSTRACT

A substantially agglomeration-free, finely divided catalyst component which is suitable for use as a cocatalyst with organoaluminum compounds in the polymerization of alpha olefins, which is formed by grinding a titanium trichloride material, an effective amount of an electron pair donor compound to enhance the performance of said catalyst component, and an effective amount for agglomeration control of an agglomeration control agent. The agglomeration control agent is effective in either reducing the attractive forces between the finely divided particles in the catalyst component or by preventing the close approach of these particles which would result in agglomeration.

103 Claims, No Drawings

SUBSTANTIALLY AGGLOMERATION-FREE CATALYST COMPONENT

CROSS-REFERENCES TO RELATED APPLICATIONS

This application is a continuation-in-part of copending application Ser. No. 643,438, filed Dec. 22, 1975, and now abandoned.

TECHNICAL DESCRIPTION OF THE INVENTION

The present invention relates to a substantially agglomeration-free, finely divided titanium trichloride-containing catalyst component which is suitable for use in the polymerization of alpha olefins.

It is well known in the art of producing titanium trichloride catalyst components that are suitable for use in the production of polymers from alpha olefins to add to the titanium trichloride material an effective amount of an electron pair donor molecule to improve the stereospecificity or the stereospecificity and activity of the ultimate catalyst composition which contains the titanium trichloride-electron donor catalyst component, Keii, Kinetics of Ziegler-Natta Polymerization, Kodansha Ltd., Tokyo, 1972, pp. 163–173. Some recent examples of the use of such electron pair donor compounds as auxiliary components during the grinding or ball milling of titanium trichloride catalyst component compositions are described in U.S. Pat. Nos. 3,639,375 to G. Staiger et al. and 3,701,763 to S. Wada et al. When such electron pair donor molecules and titanium trichloride are ground it is not uncommon for agglomeration to occur. Such an agglomerated product has no substantial utility as a catalyst component in the polymerization of alpha olefins. The deleterious effect of agglomeration has been recognized. One solution that was proposed to control agglomeration was operating, during grinding, below the temperature at which agglomeration occurs, Belgian Pat. No. 800,057. Another solution described in German Offenlegungsschrift No. 2,342,200, proposed grinding titanium trichloride with a metal hydroxide, sulphate, sulphite, phosphate, phosphite, carbonate, cyanide, thiocyanate, nitrate and/or nitrite. However, it has been found that the use of these modifying agents alone do not produce satisfactory results when the catalyst is used in a solvent containing polymerization system. The present invention is directed to another manner in which the problem of agglomeration can be controlled, even though the grinding is carried out over a wide range of temperatures, by addition of an agglomeration control agent, which will be described in greater detail below, to produce a catalyst component in finely divided form which does not have the tendency to agglomerate.

The present invention relies upon the presence during the milling or grinding operation of an effective amount for agglomeration control of a compound which will be referred to hereinafter as an agglomeration control compound. This compound controls the aggregative behaviour of the finely divided particles produced during the grinding operation of the titanium trichloride catalyst component and assures the formation of a powdery product by retaining the discreteness of the individual particles with substantially no agglomeration.

The term "agglomeration" as used herein is defined as the indiscriminate formation of aggregates or clusters of the finely divided particles due to the grinding of the titanium trichloride and electron pair donor compounds. This undesired phenomenon, if present, will result in a reduction of the catalytic activity of the component.

Very small particles which are polar in nature, such as titanium trichloride, will, upon grinding, often agglomerate to a larger size. It is believed that the tendency to agglomerate is dependent upon both the repulsive electrostatic or coulombic forces between the particles and the mutual van der Waals of attraction between said particles. While it is not desired to be bound by theory, observations indicate that for a given particle size distribution and environment, the degree of agglomeration may depend upon the combined potential of the mutual interactions between the particles and may be no more than the sum (V) of the repulsive electrostatic potential ($V_e$) and attractive van der Waals forces potential ($V_a$). For particles approximately spherical in shape the mathematical expression of $V_e$ and $V_a$ is given by formulae (I) and (II), below. Since the van der Waals forces of attraction operate at very short distances, these attractive forces will generally predominate over the repulsive electrostatic forces when the average particle size in the system decreases. Hence, fine particles that are polar in nature and which are obtained by intense and prolonged milling tend to agglomerate more readily than larger particles. It has been found in accordance with the present invention that the addition of an effective amount of an agglomeration control compound can control agglomeration in a titanium trichloride/electron pair donor mixture that has been ground and can thereby maintain the discreteness of the finely divided particles contained therein.

The agglomeration control compounds which are suitable for use herein broadly include the following classes of compounds:

(a) compounds which, when adsorbed on the finely divided particles, may modify the mutual forces of interaction and thereby are effective in keeping the particles apart. Ionic compounds are exemplary of this class. It is believed that they operate by increasing the surface potential (zeta potential) of said particles; and (b) polarizable compounds of a sufficient size so that when attached to the catalyst component particles they become a steric hindrance to the contact, and consequent agglomeration, of the catalyst particles.

As can be seen from the foregoing, the agglomeration control compound is one which is believed to either modify the mutual forces of interaction between the catalyst particles or form a steric hindrance or "barrier" between the particles which prevents contact, and consequent agglomeration, of said particles.

Prior to discussion these agglomeration control compounds in greater detail, it would be worthwhile to first give a description of the titanium trichloride and electron pair donor materials which are ground in the presence of the selected agglomeration control compound.

The titanium trichloride material which is adapted to be used in the present invention can be produced in a variety of ways including: (a) by reduction of titanium tetrachloride with a metal such as aluminum or titanium, said reduced titanium material being either milled or unmilled; (b) by reduction of titanium tetrachloride with hydrogen; (c) by reduction of titanium tetrachloride with an organometallic compound such as an aluminum alkyl; or (d) by grinding a combination of titanium trichloride and a halide of a Group III metal, such as an aluminum halide. Examples of suitable titanium trichloride starting materials are well known in the art and are described in a number of publications and patents, including U.S. Pat. Nos. 3,639,375 and 3,701,763 which are each incorporated herein by reference as showing the type of titanium trichloride starting material that is to be used in the present invention. In any case, such a starting material is then ground with an electron pair donor compound and agglomeration control agent, as described in greater detail below, to form the intended catalyst component.

The second material in the composition of the present invention is an effective amount of an electron pair donor compound, such as those described in U.S. Pat. Nos. 3,639,375 and 3,701,763, to improve the stereospecificity or stereospecificity and activity of the ultimate catalyst that results from the invention. Examples of suitable electron pair donor compounds which can be used in the present invention can be selected from the following classes of compounds:

Organic oxygen-containing compounds such as the aliphatic ethers, aromatic ethers, aliphatic carboxylic acid esters, cyclic esters of carbonic acid, aromatic carboxylic acid esters, unsaturated carboxylic acid esters, aliphatic alcohols, phenols, aliphatic carboxylic acids, aromatic carboxylic acids, aliphatic carboxylic acid halides, lactones, aromatic carboxylic acid halides, aliphatic ketones and aromatic ketones;

Organic nitrogen-containing compounds such as the aliphatic amines, aromatic amines, heterocyclic amines, aliphatic nitriles, aliphatic carbamates, aromatic nitriles, aromatic isocyanates and aromatic azo compounds;

Mixed oxygen-nitrogen compounds such as the aliphatic and aromatic amides and guanidine and its alkyl substituted derivatives;

Organic phosphorus-containing compounds such as the aliphatic phosphines, aromatic phosphines, aliphatic phosphites and aromatic phosphites;

Mixed phosphorus-nitrogen compounds such as the phosphoric amides;

Mixed phosphorus-oxygen compounds such as triphenylphosphine oxide;

Sulphur-containing compounds such as carbon disulphide, the aliphatic thioethers and the aromatic thioethers; and Organic silicon-containing compounds including monomer type compounds such as the tetrahydrocarbylsilanes, organohydrogenosilanes, organohalogenosilanes, organoaminosilanes, organoalkoxysilanes, organoaryloxysilanes, organosilicon isocyanates and organosilanol carboxylic acid esters; and polymer type of compounds such as the polysilalkylenes, organopolysilanes, organopolysiloxanes, $\alpha,\omega$ dihaloorganopoly siloxanes, organocyclopolysiloxanes and polysilazanes.

The dipole moment of most of the selected electron pair donor compounds will be in the general range from about 0.5 to about 6.0 Debye units. Examples of some particularly preferred electron pair donor compounds are hexamethyl phosphoric triamide, dimethyl formamide, benzonitrile, $\gamma$-butyrolactone, dimethyl acetamide, N-methyl pyrrolidone, triphenylphosphine oxide, N, N-dimethylpivalamide, toluene diisocyanate, dimethyl thioformamide, ethylene carbonate, trilauryltrithiophosphite, tetramethyl guanidine and methyl carbamate. Others that can be used in practicing the present invention are known to persons of ordinary skill in the art.

Other representative examples of particular electron pair donor compounds can be found in U.S. Pat. Nos. 3,639,375 and 3,701,763 which are each incorporated herein by reference.

The third essential component for the composition claimed herein is an agglomeration control compound which will prevent agglomeration of the titanium trichloride material and electron pair donor when these components are ground. As was briefly described above, two classes of agglomeration control compounds are useful in the present invention.

The first class of compound includes those ionic compounds which, when adsorbed on the finely divided particles, may function to change the zeta potential of said particles and thereby keep them from agglomerating. The following are representative examples of such ionic compounds:

(1) the ionic salts of the metals of Group IA of the Periodic Table. It should be noted that the Periodic Table referred to in the claims and specification herein is the table published in the Handbook of Chemistry and Physics, 57th edition, CRC Press, Cleveland, Ohio, Page B-4. Examples are halide salts such as lithium fluoride, lithium chloride, lithium bromide and lithium iodide and the analogous halide salts of the elements sodium, potassium, rubidium and cesium. The alkali metal salts of other common anions such as the sulfate, nitrate, stearate, borate, silicate, aluminate, citrate and thiosulfate are also to be considered as within this class of compounds. The alkali metal salts of benzene sulfonic acid and the $C_1$–$C_{20}$ alkyl sulfonic acids are also to be considered to be within this class for purposes of this invention. One compound from this class of compounds is the sodium salt of benzene sulfonic acid.

(2) the ionic salts of the Group IIA metal ions which are analogous to the salts set forth above under subclass 1;

(3) the ionic salts of the transition metals. Particularly preferred are the stearate salts of copper and zinc;

(4) quaternary ammonium salts of the general formula $R_4N^+X^-$, where R is hydrogen, alkyl or aryl and X is halide of sulfate. The trialkyl hydrochlorides, hydrobromides and hydroiodides, preferably the $C_1$–$C_4$ trialkyl compounds thereof, are examples of suitable compounds. An exemplary compound is triethylamine hydrochloride;

(5) the general class of compounds which are described as ionic surface active agents. A description of this class of compounds can be found in the Encyclopedia of Surface Active Agents, J. P. Sisley, Chemical Publishing Company, New York, Vols. I and II, 1961 and 1964;

(6) the finely divided, water-soluble ammonium salt of an amido polyphosphate wherein substantially all of the particles are less than 5 microns in diameter. It is formed by the dry vapor phase reaction of $P_2O_5$ with anhydrous ammonia as described in U.S. Pat. No. 2,122,122 to Woodstock. A typical analysis for such a product is:

|  | % |
|---|---|
| $P_2O_5$ | 76.1 |
| $NH_3$, free | 15.4 |
| $NH_3$, Total | 22.4 |
| Amide N as $NH_3$ | 7 |
| pH (1% solution) | 5.6 |

A suitable product of this type is available under the trademark "Victamide" from the Specialty Chemical Division of Stauffer Chemical Company, Westport, Connecticut. Although this compound has been proposed as a component in a four-component anticaking and antifreezing additive for bulk, particulate sodium chloride in Jacoby et al. U.S. Pat. No. 3,428,571, it is not obvious that it functions effectively as an agglomeration control compound in forming titanium trichloride catalyst components as described herein.

When a water-insoluble ammonium polyphosphate is used, an inactive catalyst component is obtained;

(7) the salts of aliphatic triacids, preferably the $C_1-C_4$ alkane tricarboxylic acids and the hydroxy substituted derivatives of such acids. One such acid is 2-hydroxy-1,2;3-propanetricarboxylic acid, which is citric acid. The alkali, alkaline earth metal salts and transition metal salts admixed with one of the foregoing anions are preferred. Two compounds which are effective are calcium citrate and ferric ammonium citrate. Use of the salts of dicarboxylic acids, such as the tartrates, is not effective;

(8) the alkyl alkali metal sulfates, preferably the $C_6-C_{18}$ alkyl substituted compounds. A suitable compound is dodecyl sodium sulfate;

(9) the alkaline earth metal phosphates. One compound which is suitable is calcium phosphate, tribasic;

(10) the alkaline earth metal titanates including calcium titanate; and

(11) the non-gaseous halogens, such as iodine, which while covalent in the free state, react with titanium trichloride in situ to provide an ionic species.

The second type of agglomeration control compound useful in the present invention are polarizable compounds which are adsorbed by the catalyst component particles, creating a steric hindrance and thereby preventing the contact of adjacent titanium trichloride catalyst particles. Generally, these titanium trichloride agglomeration control or prevention agents have either a chain length and/or diameter in the extended conformation of from about 10 to 200 Angstroms.

While it is not desired to be bound by theory, it is believed that agglomeration will not occur if the following relationship is satisfied:

$$l_3 + l_4 > k$$

where:

$l_3$ is the barrier distance afforded in the system by the electron pair donor compound;

$l_4$ is the barrier distance afforded in the system by the agglomeration control compound; and $k$ is a constant which is obtained by setting the derivative of the methematical expression for the total potential (V) of the system to zero.

The mathematical expression for the total potential of the system is merely the additive effects of the electrical repulsive potential ($V_e$) and the attractive potential ($V_a$). Each may be expressed as follows:

$$V_e = \epsilon \frac{a^2 \zeta^2}{R} \quad \text{(I)}$$

where:

$\epsilon$ is the dielectric constant of the medium;

R is the distance between two adjacent particles;

a is the average radius of the particles in the medium; and $\zeta$ is the zeta potential which is the surface potential of the spherical particle.

$$V_a = -\frac{A}{6}\left[\frac{2}{S^2-4} + \frac{2}{S^2} + \ln\left(\frac{S^2-4}{S}\right)\right] \quad \text{(II)}$$

A is the Hamaker constant which can be calculated as described by Hamaker, H.C., Physica 4, 1058 (1937) and the references cited therein, and S is R/a, where R and a are as defined above.

As can be seen from the foregoing, the physical characteristics of the electron pair donor compound, e.g., size, dipole moment, dielectric characteristics, and the like, will influence the selection of the agglomeration control compound.

Some exemplary compounds which have been found to be useful as polar agglomeration control compounds in accordance with the present invention, are:

(1) compounds of the formula

Where A is selected from the group consisting of OR, NRR', and OH, where R and R' are $C_1-C_4$ alkyl, with the proviso that at least one A is either OR or NRR'.

One preferred class of compounds have the above formula are the alkyl pyrophosphoramides, for example, octamethylpyrophosphoramide. In this compound, A is NRR' in all cases and the R and R' groups are methyl. Such compounds have been suggested as being useful as components for catalysts suitable for olefin polymerization reactions, apparently in much higher amounts than are used herein, British Pat. No. 1,372,920, but have not been suggested as anti-agglomeration agents.

Another preferred class of compounds having the above formula are the alkyl acid pyrophosphates, i.e., wherein A is selected from the group consisting of OR and OH with the proviso that at least one A is OR. A suitable subclass of compounds are the $C_1-C_4$ dialkyl acid pyrophosphates, e.g., dimethyl acid pyrophosphates, e.g., dimethyl acid pyrophosphate.

When all A groups in the above formula are OH, i.e., the compound is pyrophosphoric acid, a catalyst component of reduced activity is obtained after grinding with said compound due to agglomeration.

(2) trialkyl phosphates of the formula $(RO)_3 PO$ where R is an alkyl group, preferably a $C_1-C_6$ alkyl group. A preferred compound selected from this class is tributyl phosphate. Although compounds of this type have been suggested merely for use as third components in a titanium trichloride catalyst in much larger amounts than used herein, e.g., in Coover Jr. et al. U.S. Pat. No. 2,956,991, it is surprising that these compounds function as agglomeration control compounds when used in much lower amounts;

(3) polymeric silicon compounds selected from the group consisting of amorphous silica and the siloxanes.

Amorphous silica has been defined as substantially dehydrated, polymerized silica which may be considered as a condensation polymer of silicic acid. A suitable amorphous silica which can be used in the present invention is colloidal silica. It is available commercially, for example, under the trademark "Cab-O-Sil" from Cabot Corporation, and it comprises colloidal silica particles sintered together in chain-like formations. A typical particle size in the extended conformation for this finely divided silica is from about $7 \times 10^{-3}$ to about $14 \times 10^{-3}$ microns, and it has a surface area of from about 175 m$^2$/g to about 420 m$^2$/g. Although silica powders have been used as an anticaking additive in a number of applications, e.g., as described in Arnett Jr. U.S. Pat. No. 2,728,732, it is not obvious that they function effectively as an agglomeration control agent as described herein.

Also useful as agglomeration control compounds for use herein are the siloxanes. These are straight chain compounds, analogous to paraffin hydrocarbons, consisting of silicon atoms bonded to oxygen and so arranged that each silicon atom is linked with two oxygen atoms. The preferred siloxanes are those which are $C_1$-$C_4$ alkyl substituted, e.g., hexamethyl siloxane and polydimethylsiloxane, the former being an example of a compound having a chain length less than 10 Angstroms which functions in this invention;

When a non-polymeric silicon compound, e.g., ethyl silicate, is used, a catalyst component with reduced activity is obtained.

(4) the dialkyl phosphoric acids of the formula

where R is an alkyl, preferbly a $C_1$-$C_6$ alkyl group. One compound which is useful is diisoamyl phosphoric acid wherein the alkyl group is the isoamyl group;

(5) the dialkyl maleates and fumarates, preferably the $C_1$-$C_4$ dialkyl maleates and fumarates. Diethyl maleate is one such compound which is effective;

(6) the reaction product of a compound of the formula $(C_6H_5)_2Si(OH)_2$ and a titanate of the formula $Ti(OR)_4$, where R is an alkyl group, preferably a $C_1$-$C_4$ alkyl group. This type of product can be formed in accordance with U.S. Pat. No. 3,758,535 to L. Vizurraga.

(7) the compounds of the formula $RCONH_2$ where R is alkyl, preferably a $C_1$-$C_{18}$ alkyl group, and the polymeric alkylamides. Propionamide, stearamide, and polyacrylamide are three representative agglomeration control compounds from this class of compounds, which also includes some compounds of a chain length less than 10 Angstroms.

(8) an elemental solid selected from the group consisting of graphite, amorphous carbon and sulfur. Two preferred substances from this group include graphite, which is one of the crystalline allotropic forms of carbon (the other being the diamond) and sulfur:

(9) starch;

(10) the alkyl ketones with the proviso that the total number of carbon atoms in the two alkyl groups ranges from 20 to 30. Some exemplary ketones are laurone, which has the formula $(C_{11}H_{23})_2CO$, and 14-heptacosanone which has the formula $(C_{13}H_{27})_2CO$;

(11) epoxides and the polymeric derivatives of such compounds, with the exception of ethylene oxide and propylene oxide monomers. Two compounds from this class include the diepoxide of cyclohexenylmethyl cyclohexene carboxylate and poly(ethylene oxide) which is a water-soluble polymer made by polymerizing ethylene oxide, e.g., by the use of alkaline catalysis;

(12) the trialkyl borates, preferably the $C_1$-$C_4$ trialkyl borates. Some of these compounds have a chain length less than 10 Angstroms. A representative compound from this group is trimethyl borate. Boric acid itself will not inhibit agglomeration;

(13) urea and the alkyl substituted ureas, preferably the $C_1$-$C_4$ alkyl substituted ureas, which also includes compounds having a chain length under 10 Angstroms. Two compounds from this class are urea itself and tetramethyl urea;

(14) the alkylene diamine tetraacetic acids, preferably the $C_2$-$C_4$ alkylene compounds thereof. A preferred compound is ethylene diamine tetraacetic acid. The alkali metal salts of such acids are ineffective;

(15) the water soluble cellulose ethers including methyl cellulose and sodium carboxymethyl cellulose;

(16) the phthalocyanine colorants including phthalocyane, copper phthalocyanine, chlorinated copper phthalocyanine and sulfonated copper phthalocyanine. The preferred compound is copper phthalocyanine;

(17) the $C_1$-$C_4$ acrylates, which also include compounds of a chain length less than 10 Angstroms. A preferred reagent is methyl acrylate;

(18) compounds of the formula $(PNX_2)$ where X is chlorine or bromine and n is from 2 to 4. A preferred compound is $(PNCl_2)_n$ where n is 3 or 4;

(19) compounds of the formula

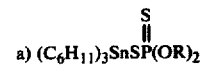

(b) $[(C_6H_{11})_3Sn]_2S$ where R is $C_1$-$C_6$ alkyl. Methods of preparing the above compounds are given in (a) Belgian Pat. No. 783,532 and (b) U.S. Pat. No. 3,264,177, respectively; and

(20) the non-gaseous alpha-olefins, such as 1-eicosene.

It should be noted that it is anticipated that not all possible polarizable compounds will function as agglomeration control compounds with each particular electron pair donor compound. For example 2-undecanone was found to be ineffective in controlling agglomeration when hexamethyl phosphoric triamide was the electron pair donor compound. This finding only confirms the fact that the efficiency of an agglomeration control compound in minimizing agglomeration is sensitive to the selection of the electron pair donor compound as described in the teachings presented above.

In order that the desired catalyst component of the present invention can be produced, it is preferred that the three components be present in certain amounts.

For example the amount of electron pair donor compound should range from about 2% to about 15%, by weight of the titanium trichloride material, preferably about 2.5% to about 10%. It is believed that the amount of electron pair donor compound should be present in an amount sufficient to form at least a monomolecular layer on the titanium trichloride particles. Thus the preferred range is dependent upon the molecular weight of the electron pair donor compound and the effective surface area of the titanium trichloride material. Use of too much electron pair donor compound will poison the catalyst component while use of too little will not result in the desired degree of improvement. It is well within the ability of a person of ordinary skill in the art to approximate the weight amount of electron pair donor compound by realizing that about 6% by weight of hexamethyl phosphoric triamide (HMPT) is needed for good results. This selected electron pair donor compound has the formula $[(CH_3)_2N]_3PO$. The approximate amount of another selected electron pair donor compound (called "Compound X", below) of similar molecular size as HMPT which should be used will be:

$$\% \text{ Compound X} = \frac{6\%}{\text{Mol. Wt. HMPT}} \times \text{Mol. Wt. Cpd. X}$$

Molecules having a smaller cross-section upon adsorption than HMPT will require correspondingly larger amounts to be equally effective in forming the monomolecular layer whereas larger molecules will require less.

The amount of agglomeration control compound which is needed for the present invention is quite small. Generally, from about 0.1% to about 5% based on the weight of electron pair donor compound, is usually effective in substantially preventing agglomeration. A preferred amount is from about 0.6% to about 3.0%. The amount of agglomeration control compound that is needed is dependent upon the nature and amount of the electron pair donor compound, as well as the average particle size of the titanium trichloride material. It is known that the average particle size of the titanium trichloride material is influenced by such factors as milling time, grinding rate and the internal configuration of the grinding apparatus. Particles obtained by using a fast grinding rate tend to agglomerate more readily than larger particles obtained by using a slow grinding rate. For smaller particle size distributions a larger amount of agglomeration control compound is needed. The grinding rate, R, as defined by Berry et al., Proc. Intern. Cong. Surface Activity, London, pp. 196–202 (1957), is related to the surface area, S, of the milled material and the time, t, of milling by the expression $R = S/t$.

The grinding operation of this invention can be performed by grinding the two aforementioned components with the agglomeration control compounds (that have been described above) under conventional temperatures and times. The grinding can be carried out in a ball mill or other suitable size reduction apparatus with the absence of diluents, in an inert atmosphere, such as nitrogen or argon, which is substantially free of oxygen, water and other catalyst poisons at a temperature and for a length of time which are suitable to reduce the mixture contained therein to a pulverulent composition which when combined with organoaluminum compounds produces a catalyst having good activity and stereospecificity in the polymerization of alpha olefins.

Generally, when using a rotary ball mill, the grinding should take place for a period of time of from about 30 hours to about 90 hours at a temperature of about 30° C. to about 70° C. However, with some systems shorter time periods are effective. Especially good results are obtained when the temperature is held at from about 45° C. to about 70° C., preferably about 50° C. to about 60° C., and the grinding is carried out at from about 40 hours to about 80 hours. One suitable apparatus for carrying out the grinding is described in U.S. Pat. No. 3,688,992 to A. Schallis. In this particular apparatus, which has a fast grinding rate, shorter milling times, e.g., 3–12 hours, can be used, although longer times can also be employed.

When measuring the temperature, the actual temperature in the interior of the ball mill is measured directly. Temperatures in excess of about 70° C. should be avoided since agglomeration of the catalyst component and subsequent deactivation of the final catalyst, may result even when the agglomeration control compound of the present invention is present.

As previously indicated, and as shown in the examples, there are many factors involved in determining the identity and quantity of the agglomeration control compound which will function with a particular electron donor compound, and the circumstances under which an agglomeration control compound is needed. For example, the polar agglomeration control compound 1-eicosene and Triton X-100 were found to be detrimental when milled with dimethyl acetamide, while the ionic agglomeration control compound sodium chloride provided good results. The data also shows that excess amounts of either or both of the electron donor compound and the agglomeration control compound can function to induce or increase agglomeration, although a certain level of the electron donor compound is required to provide the desired properties in the resultant polymer. Furthermore, milling conditions, such as temperature and amount of balls, have an effect on the phenomenon of agglomeration. Thus, increasing the number of balls in the mill induced agglomeration where $\gamma$-butyrolactone was used in the absence of an agglomeration control compound, while increasing the milling temperature had the same effect on benzophenone. These data indicate that an agglomeration control compound should be used in a commerical operation, to guard against agglomeration due to unexpected changes in milling conditions, even where initial laboratory data indicates agglomeration may not be a problem.

The product of the present invention which is produced by grinding the titanium trichloride material, electron donor compound had agglomeration control compound, can then be combined with conventional organoaluminum compounds for use in the polymerization of alpha olefins using conventional reaction conditions for such a polymerization.

Suitable organoaluminum compounds are those conventionally used, particularly alkyl compounds of aluminum of which the following are examples: trimethyl aluminum, triethyl aluminum, tributyl aluminum, triisobutyl aluminum, methyl aluminum sesquichloride, ethyl aluminum sesquichloride, diethyl aluminum chloride, ethyl aluminum dichloride, dibutyl aluminum chloride, diethyl aluminum sesquibromide. Ethyl aluminum compounds, such as triethyl aluminum and diethyl aluminum chloride, are preferred as organo-aluminum compounds.

The product of the present invention can be used for the production of polymers of alpha-olefins having from 2 to 8 carbon atoms, including propylene homopolymers, copolymers of propylene and ethylene, ethylene homopolymers, and polymers of butene-1, 3-methylbutene-1, and 4-methylpentene-1. The polymerization of such monomers is generally carried out at temperatures anywhere from about 10° C. to about 150° C. using pressures of from about 0.5 to about 100 atmospheres.

The following Examples illustrate certain preferred embodiments of the present invention and are presented merely to illustrate certain preferred embodiments of the invention. These Examples should not be construed in a limiting sense.

EXAMPLE 1

This example illustrates the general preparation of an electron pair donor-modified, titanium trichloride/catalyst component using an agglomeration control compound to obtain a finely divided product.

Pure hexamethyl phosphoric triamide (about 3.2 grams) was mixed with about 0.032 grams of one of the agglomeration control agents listed in Table 1 set forth in Example 4, below, and was weighed in a small vial. The mixture was then poured into an 11 cm. inner diameter, 15 cm. long stainless steel mill in a glove box operated under nitrogen with exclusion of air and moisture. the mill, which contained 875 grams of 1 cm. diameter magnetized stainless steel balls, was shaken so that a liquid film was formed around the balls and the inner walls of the mill. To this was then added 50 grams of titanium trichloride which has been obtained by reducing titanium tetrachloride with aluminum metal. It is a cocrystallized product corresponding to the formula $3TiCl_3 \cdot AlCl_3$ ("TiCl$_3$A" from Stauffer Chemical Company, Specialty Chemical Division, Westport, Connecticut). The mill was subsequently closed so as to be airtight and was rotated at 110 rpm. for 48 hours at 50° C. The temperature was maintained via a system comprising a thermocouple inserted in an oil well inside the mill, a temperature controller and a temperature recorder. External heat was provided via infrared radiation. At the end of the 48 hour period, the essentially agglomeration-free, finely divided catalyst component was transferred to a jar in the dry box and was tested, as outlined in Example 2, for activity and isotactic index. In the following examples, unless otherwise specified, the procedure and conditions of this example were used. "TiCl$_3$A" was used in all the examples. Agglomeration was observed visually except in example 14; where no percentage of agglomeraton is reported, at least 30% of the composition was observed to be agglomerated.

EXAMPLE 2

The Example sets forth the testing procedure that was utilized to determine the activity and isotactic index of the product formed using the type of catalyst components described in Example 1.

To a one gallon jacketed autoclave equipped with a stirrer that was set at 600 rpm. was charged 1 liter of dry heptane. About 0.3 grams of the product from Example 1 was suspended in the heptane under a nitrogen atmosphere and 8 ml. of a 20% of weight solution of diethyl aluminum chloride in heptane was added. An additional 1 liter of dry heptane was charged into the autoclave, and the autoclave was then closed. The temperature was raised to 70° C., the autoclave was vented, hydrogen gas (3.2 lbs/in$^2$), was charged, and propylene was fed at a constant pressure into the reactor at 142 lbs./in$^2$. The propylene had been purified by being passed through a column of a copper based catalyst to remove trace amounts of oxygen and through a molecular sieve resin (LINDE type 4A) to remove traces of water. The polymerization test was carried out for four hours. At the end of this period the catalyst was destroyed by addition of a propanol/water mixture, and the polymer product was filtered, dried at 70° C. overnight and was weighed. About 6 grams of the dry polymer was extracted with heptane for three hours in a Soxhlet apparatus. The percentage amount of the non-extracted portion of the polymer was designated "C$_7$i. From an aliquot of the filtrate was determined, via solvent evaporation, the amount of the soluble or atactic polymer that was produced.

The activity was defined as the amount of dry solid, polymer (obtained from the reaction) in grams per gram of TiCl$_3$-containing catalyst preparation made in accordance with Example 1.

The isotactic index (II) was defined by the following formula:

$$II = \frac{C_{7i} \times \text{Wt. Solid Polymer}}{\text{Wt. Total Polymer Produced}}$$

The total polymer produced includes the above-described insoluble (isotactic) and soluble (atactic) polymer portions.

EXAMPLE 3

This Example illustrates the preparation of an electron donor-modified titanium trichloride catalyst component in the absence of an agglomeration control compound.

Pure hexamethyl phosphoric triamide (about 3.2 grams) was weighed into a small vial. This compound (hereinafter abbreviated HMPT) was added to the ball mill used in Example 1. Next, 50 g. of TiCl$_3$A was added to the mill and the mill was closed and rotated at 110 rpm for 48 hours at 50° C. At the end of the milling period, the mill was opened under an inert atmosphere. The TiCl$_3$/HMPT mixture was lumpy and tended to adhere to the walls of the mill and the balls. The product was not a satisfactory candidate for propylene polymerization.

EXAMPLE 4

The Table set forth below gives the activity and isotactic index values for a variety of catalyst components formed by the procedure of Example 1, tested as described in Example 2 and containing one of the agglomeration control compounds suitable for use in the present invention. The compounds having a single asterisk did not function as agglomeration control agents and are structurally related to those compounds immediately preceding them.

TABLE I**

| Compound Tested For Agglomeration Control | Activity | Isotactic Index |
|---|---|---|
| Octamethylpyrophosphoramide | 1450 | 94.5 |
| Dimethyl acid pyrophosphate | 788 | 95.8 |
| Pyrophosphoric acid | * | * |
| Tributyl phosphate | 1369 | 95.1 |
| NH$_4$ salt of amido polyphosphate (water soluble)$^1$ | 1357 | 94.8 |
| NH$_4$ salt of amido polyphosphate (water insoluble)$^2$ | * | * |
| Amorphous silica$^3$ | 1440 | 93.6 |
| Hexamethyl siloxane | 996 | 94.9 |
| Polydimethyl siloxane | 960 | 95.9 |
| Ethyl silicate | * | * |
| Diisoamyl phosphoric acid | 1362 | 94.7 |
| Diethylmaleate | 1369 | 94.4 |
| (C$_6$H$_5$)$_2$Si(OH)$_2$ + Ti (OCH[CH$_3$]$_2$) $_4$$^4$ | 1440 | 94.2 |
| Triethylamine hydrochloride | 1482 | 93.2 |
| Propionamide | 1431 | 93.8 |
| Stearamide | 1314 | 94.1 |
| Polyacrylamide | 1341 | 93.8 |
| Graphite | 1460 | 92.7 |
| Sulfur | 1477 | 93.2 |
| Iodine | 1324 | 93.7 |
| Sodium Chloride | 1413 | 94.3 |
| Benzene Sulfonic Acid, Na salt | 1360 | 93.7 |
| Laurone | 1507 | 94.5 |
| Diepoxide of cyclohexenylmethyl cyclohexene carboxylate$^5$ | 1128 | 94.5 |
| Poly(ethylene oxide) | 1323 | 93.5 |
| Calcium borate | 1093 | 95.0 |
| Trimethyl borate | 1162 | 93.1 |

TABLE I**-continued

| Compound Tested For Agglomeration Control | Activity | Isotactic Index |
|---|---|---|
| Boric acid | * | * |
| Urea | 944 | 92.2 |
| Tetramethyl urea | 858 | 92.3 |
| Zinc stearate | 1293 | 91.7 |
| Copper stearate | 1455 | 94.6 |
| Magnesium stearate | * | * |
| Ethylene diamine tetraacetic acid | 1454 | 92.1 |
| Ethylene diamine tetraacetic acid, Na salt | * | * |
| Calcium citrate | 1346 | 89.0 |
| Ferric ammonium citrate | 1492 | 93.7 |
| Calcium tartrate | * | * |
| Dodecyl sodium sulfate | 1310 | 94.7 |
| Methyl cellulose | 1066 | 95.5 |
| Sodium carboxymethyl cellulose | 1386 | |
| Copper phthalocyanine | 881 | 93.2 |
| Starch | 1056 | 95.9 |
| Sodium thiousulfate | 949 | 95.3 |
| Methyl acrylate | 1461 | 92.0 |
| Calcium phosphate, tribasic | 1104 | 95.5 |
| Calcium titanate | 1275 | 94.9 |
| $(PNCl_2)_3$ or | 1393 | 94.7 |
| $(C_6H_{11})_3SnSP(S)(OiPr)_2$[6] | 1372 | 88.4 |
| $[(C_6H_{11})_3Sn]_2S$ | 1039 | 87.9 |

Footnotes
[1]available as "Victamide" from the Specialty Chemical Division of Stauffer Chemical Company, Westport, Connecticut.
[2]available as "Phoschek P-30" from Monsanto Co.
[3]available as "Cab-O-Sil", Grade M-5, from Cabot Corporation.
[4]formed in accordance with U.S. Patent No. 3,758,535.
[5]available as "ERL-4221" from Union Carbide Co.
[6]formed by the processes shown in Belgian Patent No. 783,532 and U.S. Patent No. 3,264,177, respectively.
**The tendency to agglomerate is dependent upon particle size which is determined by the various parameters of the grinding operation. Under milling conditions different from those used in Table I, the activity and isotactic index for the same amount of agglomeration control compound may vary.

EXAMPLE 5

This Example illustrates the increased activity and isotactic index which are obtained when the ball milling of the catalyst component is carried out at the preferred temperature range described herein, e.g., about 50° C., as compared to carrying it out at room temperature for both hexamethyl phosphoric triamide (HMPT) containing catalyst components (about 6-8% HMPT based on the weight of $3TiCl_3 \cdot AlCl_3$). The procedure described in Example 1 was used to prepare the catalyst component which was then subjected to the procedure of Example 2 to determine the activity and isotactic index. The length of time for ball milling the catalyst component was set at either 48 or 72 hours as set forth in Table 2 which follows:

TABLE 2

| Catalyst Component | Ball Milling (hours) | Activity (50° C) | I.I. 50° C. | Activity (Room temp)* | I.I. (Room temp)* |
|---|---|---|---|---|---|
| $3TiCl_3 \cdot AlCl_3$ | 48 | 1338 | 86.2 | 619 | 82.6 |
| $3TiCl_3 \cdot AlCl_3$ | 72 | 1402 | 88.7 | 1070 | 88.2 |
| $3TiCl_3 \cdot AlCl_3$ + 6-8% HMPT** | 48 | 1409 | 93.6 | 881 | 87.4 |
| $3TiCl_3 \cdot AlCl_3$ + 6-8% HMPT** | 72 | 1450 | 94.0 | 1267 | 88.5 |

*The actual temperature in the interior of the ball mill was about 35° C.
**The HMPT contained about 0.2% of octamethylpyrophosphoramide as agglomeration control agent.

EXAMPLE 6

A variety of electron pair donor (abbreviated "ED" in Table 3 below) compounds and agglomeration control (abbreviated AC) compounds were prepared and tested in accordance with the general procedures described in Examples 1-2. Table 3 sets forth the results that were obtained:

TABLE 3

| ED Compound | Wt. %* | AC Compound | Wt. %** | Activity | II |
|---|---|---|---|---|---|
| Dimethyl formamide | 2.2 | 14-heptacosanone | 3.6 | 1252*** | 93.9[2] |
| Dimethyl formamide | 2.5 | Sodium chloride | 3.0 | 1302 | 91.8[2] |
| Dimethyl formamide | 4.1 | 14-heptacosanone | 1.8 | 1323 | 92.6[2] |
| Benzonitrile | 3.0 | 14-heptacosanone | 2.6 | 1394*** | 92.0[2] |
| Benzonitrile | 3.1 | Laurone | 1.5 | 1300*** | 92.4[1] |
| γ-Butyrolactone | 5.8 | Sodium Chloride | 1.1 | 1353 | 94.9[1] |
| γ-Butyrolactone | 6.2 | Starch | 1.1 | 1467 | 94.0[1] |
| n-Butyl laurate | 6.2 | Starch | 0.8 | 1167 | 92.2[1] |
| Dimethyl acetamide | 3.0 | Iodine | 2.0 | 1143*** | 93.4[1] |
| Dimethyl acetamide | 2.9 | Sodium Chloride | 2.2 | 1368 | 92.5[1] |
| Dimethyl acetamide | 4.0 | Sodium Chloride | 2.1 | 1265 | 95.3[1] |
| Dimethyl acetamide | 3.0 | Triton X-100**** | 2.0 | 1555*** | 91.6[1] |
| N-methyl pyrrolidone | 3.5 | Iodine | 1.7 | 1397 | 92.9[1] |
| N-methyl pyrrolidone | 3.5 | 1-eicosene | 2.0 | 1425 | 93.0[1] |
| N-methyl pyrrolidone | 4.6 | Iodine | 1.9 | 1170 | 95.1[1] |
| Triphenylphosphine Oxide | 9.0 | Sodium bromide | 2.3 | 1697 | 94.2[2] |
| N,N-dimethylpivalamide | 4.4 | Sodium bromide | 2.1 | 1336 | 94.2[2] |
| N,N-dimethylpivalamide | 4.5 | 1-eicosene | 2.9 | 1152 | 95.3[1] |
| Toluene diisocyanate (80% 2,4 isomer; 20% 2,6 isomer) | 6.2 | Sodium bromide | 1.9 | 1221 | 94.0[1] |
| Dimethyl thioformamide | 3.0 | Sodium bromide | 2.5 | 1146 | 93.0[1] |
| Ethylene carbonate | 3.1 | Sodium chloride | 2.5[1] | No agglomeration - not tested in polymerization | |
| Ethylene carbonate | 3.1 | 1-eicosene | 3.8[1] | " | |
| Tetramethylguanidine | 4.2 | Sodium bromide | 1.6[1] | | |
| Methyl carbamate | 2.7 | Sodium bromide | 3.3[2] | " | |
| Methyl carbamate | 2.6 | 1-eicosene | 4.7[2] | " | |
| Dimethylacetamide | 3.0 | None | — | 1256 | 92.9[1] |
| Dimethylacetamide | 3.5 | 1-eicosene | 2.6 | 50% agglomeration[1] | |
| Dimethylacetamide | 2.9 | Triton X-100**** | 2.1 | 75% agglomeration[2] | |

TABLE 3-continued

| ED Compound | Wt. %* | AC Compound | Wt. %** | Activity | II |
|---|---|---|---|---|---|
| Benzonitrile | 3.4 | None | — | 1097 | 91.6[1] |
| γ-Butyrolactone | 6.2 | None | — | 98% agglomeration[2] | |
| γ-Butyrolactone | 6.1 | None | — | 1154 | 94.4[1] |
| Dimethyl formamide | 2.7 | None | — | 90% agglomeration[2] | |
| Dimethyl formamide | 2.4 | Stearamide | 1.8 | 100% agglomeration[2] | |
| Dimethyl formamide | 2.5 | None | — | 1600 | 93.9[2] |
| N-methyl pyrrolidone | 3.5 | None | — | 1507 | 92.1[1] |
| $(C_6H_5)_3PO$ | 9.1 | 1-eicosene | 2.7 | 90% agglomeration[2] | |
| Ethylene carbonate | 3.1 | None | — | 1088 | 93.0[1] |
| Ethylene carbonate | 3.1 | Iodine | 2.3 | 80% agglomeration[1] | |

*the weight percent is based on the weight of titanium trichloride material.
**the weight percent is based on the weight of electron pair donor compound.
***based on the average of two polymerization runs
****available from Rohm & Haas. It is octyl phenoxy polyethoxy ethanol.
[1]the grinding was done in a laboratory ball mill containing 875 g. of 1-cm balls.
[2]the grinding was done in a laboratory ball mill containing 1750 g. of 1-cm balls.

EXAMPLE 7

This Example shows the effect of increasing the amount of electron pair donor molecule and the amount of agglomeration control compound. Higher levels of electron pair donor compound will require a higher level of agglomeration control compound due to an increase in the attractive forces between the finely divided titanium trichloride particles that are coated with the donor compound. In this example hexamethyl phosphoric triamide (HMPT) and octamethylpyrophosphoramide (OMPA) were selected as the donor compound and agglomeration controller respectively. The procedure of Examples 1 and 2 was followed.

TABLE 4*

| % HMPT | % OMPA | ACTIVITY | II |
|---|---|---|---|
| 4.5 | 0.2 | 1318 | 94.0 |
| 6.5 | 0.3 | AGGLOMERATION | |
| 6.2 | 1.1 | 1266 | 93.3 |
| 6.2 | 2.7 | 1184 | 94.4 |

*carried out in the apparatus shown in U.S. Patent No. 3,68°,992 which has a faster grinding rate than the apparatus used in Example 1. The apparatus was loaded with 200 lbs of 0.5 inch diameter balls and milling was carried out at a rotation speed of 285 rpm.

EXAMPLE 8

This Example illustrates the general fact that only small amounts of ionic agglomeration control (AC) compound are needed to control agglomeration of a titanium trichloride/electron pair donor (ED) mixture.

TABLE 5

| ED | Wt. of ED* | AC | Wt. % AC** | Activity*** | II |
|---|---|---|---|---|---|
| HMPT | 6.3 | Triethylamine hydrochloride | 0.9 | 1482 | 93.2 |
| Dimethyl acetamide | 2.9 | Sodium Chloride | 2.2 | 1368 | 92.5 |

*based on the amount of titanium trichloride material.
**based on the amount of electron pair donor compound.
***depending upon the milling conditions and apparatus, visible agglomeration occurs when the AC compound is not used.

EXAMPLE 9

This Example illustrates the fact that relatively small amounts of polarizable agglomeration control compounds control agglomeration.

TABLE 6

| ED | Wt. % ED | AC | Wt. % AC[2] | Activity[3] | II |
|---|---|---|---|---|---|
| HMPT | 5.8 | Propionamide | 1.0 | 1431 | 93.8 |
| Dimethyl formamide | 2.2 | 14-heptacosanone | 3.6 | 1252[4] | 93.9[4] |
| Dimethyl acetamide | 3.0 | Iodine | 2.0 | 1143[4] | 93.4[4] |
| Benzonitrile | 3.1 | Laurone | 1.5 | 1300[4] | 92.4[4] |
| N-methyl pyrrolidone | 3.5 | 1-eicosene | 2.0 | 1425 | 93.0 |

[1]based on the amount of titanium trichloride material.
[2]based on the amount of electron pair donor
[3]depending on the milling apparatus, agglomeration will occur if the agglomeration control compound is not present.
[4]average of two polymerization runs.

EXAMPLE 10

This Example illustrates the effect that the grinding rate has on the level of agglomeration when the agglomeration control compound is used. The tendency towards agglomeration decreases with higher levels of agglomeration control compound and increases with an increased grinding rate. In the Table presented below the relatively low activity of run No. 2 is believed to indicate the onset of agglomeration which is seen in run No. 4.

TABLE 7

| RUN NO. | WT. % HMPT | WT. % OMPA | TEMP. | GRINDING RATE* | ACTIVITY | II |
|---|---|---|---|---|---|---|
| 1 | 4.5 | 0.2 | 50° C. | Slow (48 hrs.) | 1318 | 94.0 |
| 2 | 4.5 | 0.3 | 50° C. | Medium (12 hrs.) | 405 | 93.0 |

TABLE 7-continued

| RUN NO. | WT. % HMPT | WT. % OMPA | TEMP. | GRINDING RATE* | ACTIVITY | II |
|---|---|---|---|---|---|---|
| | | | | | (agglomeration was beginning | |
| 3 | 4.5 | 0.6 | 50° C. | Medium (12 hrs.) | 1133 | 93.6 |
| 4 | 4.5 | 0.3 | 50° C | Fast (7 hrs.) | Agglomeration (after 3 hrs.) | |
| 5 | 4.5 | 0.6 | 50° C. | Fast (7 hrs.) | 1355 | 94.7 |

*as Berry et al. have noted, the grinding rate, R, is dependent on the surface area of the grinding medium (e.g., balls in the ball mill) per unit weight of material being ground. The rate is also dependent on the size of the balls and the diameter of the mill. Between different types of milling apparatus it is often difficult to predict the milling rate R. Characterization of milling rates for different machines is most often determined empirically under a given set of operation conditions. Conventional laboratory ball mills, such as those used in Example 1 are classified for purposes of the present invention as having a "slow" milling rate. Larger equipment of the type described in U.S. Pat. No. 3,688,992 to A. Schallis operated at different speeds are classified as having either "medium" or "fast" grinding rates depending on the speed of rotation which is selected. The slow lab mill contained about 875 g.l-cm. balls. The "medium" rotation speed for the apparatus shown in U.S. Pat. No. 3,688,992 was 145 rpm. whereas the "fast" speed was 285 rpm. The energy imput for the "medium" speed was 6 amps. whereas the energy input for the fast speedwas 7.5 amps. The apparatus shown in U.S. Pat. No. 3,688,992 was loaded with 200 lbs of 0.5 inch diameter balls for both the "medium" and "fast" speed runs.

EXAMPLE 11

This Example is presented for comparative purposes to list those additional non-effective candidate agglomeration control compounds not listed with an asterisk in Table 1 which were prepared and tested in accordance with the particular procedures described in Examples 1 and 2 when hexamethyl phosphoric triamide was the selected electron pair donor compound:

EXAMPLE 12

This Example is also presented for comparison purposes to show examples of particular combinations of electron pair donor compound and agglomeration control candidate that were tested in accordance with the particular procedure shown in Examples 1–3 and which gave rise to agglomeration. The inoperative combinations are due to a large excess of electron pair donor compound for formation of more than a monomolecular layer. Table 9 given below lists the results and uses the same abbreviations given in Table 3:

TABLE 8*

Sodium trimetaphosphate
Toluene
Kappa Carrageenan
Ammonium Dihydrogenphosphate
Sodium acetate
12-Anisaldehyde Sulfanilamide Di-n-propyl disulfide
Pentaerythritol $(\text{C}_6\text{H}_4(\text{O})_2\text{P})_2\text{O}$ 2-undecanone
Teflon® K-10 flourinated polymer Titanium oxide
Phosphorus pentoxide $[\text{O(CH}_2\text{CH}_2)_2\text{N}]_3\text{PO}$ Magnesium oxide
Dodecyl trimethyl ammonium diphenyl phosphate
Methyl amyl ketone (cyclic structure with PNHCH$_2$CH$_2$CH$_2$NHP dioxaphosphorinane groups)

Isoquinoline
Thorium oxide
$(\text{C}_3\text{H}_7\text{O}_2)_2\text{TiO}$ (cyclic structure: NH—PN(n-Pr)$_2$=O—NH)

*these compounds were not tested in polymerization runs.

TABLE 9

| ED Compound | Wt. %* | AC Candidate | Wt. %** | Degree of Agglomeration |
|---|---|---|---|---|
| Isopentyl ether | 6.14 | — | — | >90% |
| Isopentyl ether | 5.79 | Iodine | 1.14 | >90% |
| Pyridine | 6.22 | Iodine | 1.44 | >90% |
| γ-butyrolactone | 6.25 | — | — | 98% |
| Trilauryltrithiophosphite | 5.8 | Iodine | 1.2 | ~90% |
| Trilauryltrithiophosphite | 5.7 | Silica | 0.9 | none*** |
| γ-butyrolactone | 6.1 | Iodine | 1.0 | ~25% |
| Isopentyl ether | 6.04 | Triethylamine hydrochloride | 0.8 | ~80% |
| N,N-dimethyl formamide | 6.1 | — | — | 100% |
| Pyridine | 6.1 | Propionamide | 1.03 | 95% |

TABLE 9-continued

| ED Compound | Wt. %* | AC Candidate | Wt. %** | Degree of Agglomeration |
|---|---|---|---|---|
| Pyridine | 6.29 | Sodium Chloride | 0.96 | 95% |
| γ-butyrolactone | 6.16 | Propionomide | 0.88 | 90% |
| γ-butyrolactone | 5.8 | Sodium Chloride | 1.08 | 5-10%+ |

*based on the weight of the titanium trichloride material.
**based on the weight of the electron pair donor compound.
***when tested in accordance with Example 2 gave an activity of 1195 and an isotactic index of 91.2.
+gave activities of 1153 and 1431 and isotactic indices of 96.0 and 93.8, respectively The degree of agglomeration was estimated visually.

EXAMPLE 13

This Example illustrates for comparative purposes the results of a number of experiments which show the varying effect of a number of candidate agglomeration control compounds on selected electron pair donor compounds. Once again the inoperative combinations are due to the presence of an excess electron pair donor and/or agglomeration control compound.

TABLE 10

| Level of ED | AC | Level of AC | Agglomeration (%) |
|---|---|---|---|
| (ED = γ-butyrolactone) | | | |
| 6.08 | — | — | 98 |
| 6.1 | Iodine | 1.0 | 25 |
| 6.2 | Propionamide | 0.88 | 90 |
| 5.8 | Sodium Chloride | 1.08 | 5-10 |
| 6.0 | Sodium Chloride | 1.8 | 95 |
| 6.2 | Silica | 1.0 | 75 |
| 6.2 | OMPA* | 1.4 | 50 |
| 6.0 | OMPA | 3.0 | 95 |
| 6.0 | Sodium Chloride | 1.0 | 75 |
| 6.0 | Laurone | 1.0 | 80 |
| ED = Pyridine | | | |
| 6.0 | — | — | 58 |
| 6.2 | Iodine | 1.4 | >90 |
| 6.1 | Propionamine | 1.0 | 95 |
| 6.3 | Sodium Chloride | 1.0 | 95 |
| ED = (CH$_3$)$_3$PS | | | |
| 5.9 | — | — | 17 |
| 6.4 | — | — | 50 |
| 6.1 | Silica | 1.2 | 60 |
| 6.1 | Sodium Chloride | 2.0 | 60 |
| ED = Isopropyl ether | | | |
| 6.1 | — | — | — |
| 5.9 | Iodine | 1.1 | >90 |
| 6.0 | Triethylamine hydrochloride | 0.9 | 80 |
| 6.3 | OMPA | 1.2 | 90 |
| (ED = Dimethyl formamide) | | | |
| 6.1 | — | — | 100 |
| 6.0 | Sodium Chloride | 0.8 | 100 |
| (ED = Triethylamine) | | | |
| 6.1 | — | — | 100 |
| 6.0 | OMPA | 1.2 | 100 |
| (ED = n-butyl ether) | | | |
| 6.0 | — | — | 100 |
| 6.1 | OMPA | 1.2 | 100 |

EXAMPLE 14

This example demonstrates that a change in milling conditions can induce agglomeration in a particular electron donor. It also compares a TiCl$_3$ composition with a TiCl$_3$ — electron donor composition and with a TiCl$_3$ — electron donor-agglomeration control compound composition. In the runs presented below in Table 11, agglomeration was determined by sieving the milled catalyst component compositions; an increase in the percentage of the particles in the composition having a particle size less than 75 microns when an agglomeration control compound was used was considered as evidence of agglomeration control. In all the runs, benzophenone was used as the electron donor and sodium bromide as the agglomeration control compound. The general procedure of Example 1 was followed with exception that 1750 grams of 1 cm. diameter balls were used and a milling temperature of 55° C. was employed, since it has been determined that benzophenone did not appear to induce agglomeration at a milling temperature of 50° C. The polymerization and activity and II determination were carried out as described in Example 2. Unless otherwise indicated, all the data reported for activity and II represents an average for two polymerization runs.

TABLE 11

| | | PARTICLE DISTRIBUTION | | | | |
|---|---|---|---|---|---|---|
| WT OF % BENZOPHENONE | WT % NaBr | (%>150 Microns) | (% 75-150 Microns) | (% <75 Microns) | ACTIVITY | II |
| — | — | 9 | 8 | 83 | — | — |
| — | — | 11 | 6 | 83 | 1075 | 91.5 |
| — | — | 6 | 9 | 85 | 1266 | 90.7 |
| — | — | 5 | 13 | 82 | 1166 | 91.6 |
| — | — | 6 | 8 | 86 | 1114 | — |
| 6 | — | 55 | 10 | 35 | 572 | 95.2 |
| 6 | — | 46 | 9 | 45 | 959 | 94.8 |
| 6 | 2.9 | 31 | 5 | 64 | 890 | 95.3 |
| 6 | 2.9 | 15 | 6 | 79 | 1025 | 92.7 |
| 6 | 3.9 | 25 | 4 | 71 | 830 | 95.3 |
| 6 | 3.9 | 13 | 5 | 82 | 1078[1] | 94.9[1] |

[1]Represents the average of three polymerization runs.

The preceding Examples are merely illustrative of certain preferred embodiments of the present invention. The scope of protection that is desired is set forth in the Claims which follow.

What is claimed:

1. An improved catalyst component of the type formed by grinding a titanium trichloride material with an effective amount of an electron pair donor compound for improving the stereospecificity or stereospecificity and activity of the catalyst component, said component having a tendency to agglomerate, wherein the improvement comprises making an essentially agglomeration-free finely divided component by performing said grinding in the presence of an effective amount of an agglomeration control compound for substantially preventing agglomeration in the catalyst component, wherein the agglomeration control compound is a polarizable compound which when attached to particles in the composition becomes a steric hindrance to the contact of said particles.

2. A composition as claimed in claim 1 wherein the titanium trichloride material is selected from the group consisting of material formed by: (a) reduction of titanium tetrachloride with a metal; (b) reduction of titanium tetrachloride with hydrogen; (c) reduction of titanium tetrachloride with an organometallic compound and (d) grinding titanium trichloride and a halide of a Group III metal.

3. A composition as claimed in claim 1 wherein the titanium trichloride material is formed by reducing titanium tetrachloride with aluminum.

4. A composition as claimed in claim 3 wherein the electron pair donor compound is present at from about 2% to about 15% by weight of the titanium trichloride material.

5. A composition as claimed in claim 3 wherein the electron pair donor compound is present at from about 2.5% to about 10% by weight of the titanium trichloride material.

6. A composition as claimed in claim 3 wherein the agglomeration control compound is a polarizable compound selected from the group consisting of: compounds of the formula $(A)_2P(O)OP(O)(A)_2$ wherein A is selected from the group consisting of OR, NRR', and OH, where R and R' are alkyl with the proviso that at least one A is either OR or NRR'; trialkyl phosphates of the formula $(RO)_3PO$, where R is an alkyl group; polymeric silicon compounds selected from the group consisting of amorphous silica and the siloxanes; and the dialkyl phosphoric acids of the formula $(RO)_2P(O)OH$ where R is an alkyl group; the dialkyl maleates and fumarates; the reaction product of $(C_6H_5)_2Si(OH)_2$ and a titanate of the formula $Ti(OR)_4$ where R is an alkyl group; compounds of the formula $RCONH_2$, where R is a $C_1$-$C_{18}$ alkyl group; polyacrylamide; an elemental solid selected from the group consisting of graphite, amorphous carbon and sulfur; starch; the alkyl ketones with the proviso that the total number of carbon atoms in the two alkyl groups ranges between 20 and 30; epoxides and the polymers thereof, with the exception of etheylene oxide and propylene oxide monomers; the trialkyl borates; urea and the alkyl substituted ureas; the alkylene diamine tetraacetic acids; the water soluble cellulose ethers; the phthalocyanine colorants; the $C_1$-$C_4$ acrylates; compounds of the formula $(PNX_2)$ where X is chlorine or bromine and n is from 2 to 4; compounds of the formula $(C_6H_{11})_3SnSP(S)(OR)_2$ or $[(C_6H_{11})_3Sn]_2S$ where R is $C_1$-$C_6$ alkyl, and the non-gaseous alpha-olefins.

7. A composition as claimed in claim 3 wherein the amount of agglomeration control compound which is effective in preventing agglomeration ranges from about 0.1% to about 5%, by weight based on the weight of the electron pair donor compound.

8. A composition as claimed in claim 3 wherein the amount of agglomeration control compound which is effective in preventing agglomeration ranges from about 0.6 to about 3.0% by weight based on the weight of the electron pair donor compound.

9. A composition as claimed in claim 3 wherein the agglomeration control compound has the formula $(A)_2P(O)OP(O)(A)_2$ wherein A is selected from the group consisting of OR, NRR' and OH where R and R' are $C_1$-$C_4$ alkyl, with the proviso that at least one A is either OR or NRR'

10. A composition as claimed in claim 9 wherein the agglomeration control compound is selected from the group consisting of octamethylpyrophosphoramide and dimethyl acid pyrophosphate.

11. A composition as claimed in claim 3 wherein the agglomeration control compound is a trialkyl phosphate of the formula $(RO)_3PO$ wherein R is a $C_1$-$C_6$ alkyl group.

12. A composition as claimed in claim 11 wherein the agglomeration control compound is tributyl phosphate.

13. A composition as claimed in claim 3 wherein the agglomeration control compound is a polymeric silicon compound selected from the group consisting of amorphous silica and the siloxanes.

14. A composition as claimed in claim 13 wherein the agglomeration control compound is selected from the group consisting of amorphous colloidal silica particles sintered together in chain-like formations and having a particle size of from about $7 \times 10^{-3}$ to about $14 \times 10^{-3}$ microns, hexamethyl siloxane and polydimethylsiloxane.

15. A composition as claimed in claim 3 wherein the agglomeration control compound is a dialkyl phosphoric acid of the formula $(RO)_2P(O)OH$ where R is a $C_1$-$C_6$ alkyl group.

16. A composition as claimed in claim 15 wherein the agglomeration control compound is diisoamyl phosphoric acid.

17. A composition as claimed in claim 3 wherein the agglomeration control compound is a $C_1$-$C_4$ dialkyl maleate or fumarate.

18. A composition as claimed in claim 17 wherein the agglomeration control compound is diethyl maleate.

19. A composition as claimed in claim 3 wherein the agglomeration control compound is the reaction product of a compound of the formula $(C_6H_5)_2Si(OH)_2$ and a titanate of the formula $Ti(OR)_4$ where R is a $C_1$-$C_4$ alkyl group.

20. A composition as claimed in claim 3 wherein the agglomeration control compound is selected from the group consisting of compounds of the formula $RCONH_2$, where R is a $C_1$-$C_{18}$ alkyl group, and polyacrylamide.

21. A composition as claimed in claim 20 wherein the agglomeration control compound is selected from the group consisting of propionamide, stearamide and polyacrylamide.

22. A composition as claimed in claim 3 wherein the agglomeration control compound is an elemental solid selected from the group consisting of graphite, amorphous carbon and sulfur.

23. A composition as claimed in claim 3 wherein the agglomeration control compound is starch.

24. A composition as claimed in claim 3 wherein the agglomeration control compound is a dialkyl ketone having from 20 to 30 carbon atoms in the two alkyl groups.

25. A composition as claimed in claim 24 wherein the agglomeration control compound is selected from the group consisting of laurone and 14-heptacosanone.

26. A composition as claimed in claim 3 wherein the agglomeration control compound is selected from the group consisting of the epoxides and polymers thereof, with the exception of ethylene oxide and propylene oxide monomers.

27. A composition as claimed in claim 26 wherein the agglomeration control compound is selected from the group consisting of the diepoxide of cyclohexenylmethyl cyclohexene carboxylate and poly(ethylene oxide).

28. A composition as claimed in claim 3 wherein the agglomeration control compound is a $C_1$-$C_4$ trialkyl borate.

29. A composition as claimed in claim 28 wherein the agglomeration control compound is trimethyl borate.

30. A composition as claimed in claim 3 wherein the agglomeration control compound is selected from the group consisting of urea and the $C_1$-$C_4$ alkyl substituted ureas.

31. A composition as claimed in claim 30 wherein the agglomeration control compound is selected from the group consisting of urea and tetramethyl urea.

32. A composition as claimed in claim 3 wherein the agglomeration control compound is a $C_2$-$C_4$ alkylene diamine tetraacetic acid.

33. A composition as claimed in claim 32 wherein the agglomeration control compound is ethylene diamine tetracetic acid.

34. A composition as claimed in claim 3 wherein the agglomeration control compound is a water soluble cellulose ether.

35. A composition as claimed in claim 34 wherein the agglomeration control compound is selected from the group consisting of methyl cellulose and sodium carboxymethyl cellulose.

36. A composition as claimed in claim 3 wherein the agglomeration control compound is selected from the group consisting of phthalocyanine, copper phthalocyanine, chlorinated copper phthalocyanine and sulfonated copper phthalocyanine.

37. A composition as claimed in claim 3 wherein the agglomeration control compound is a $C_1$-$C_4$ acrylate ester.

38. A composition as claimed in claim 37 wherein the agglomeration control compound is methyl acrylate.

39. A composition as claimed in claim 3 wherein the agglomeration control compound has the formula $(PNX)_n$ where X is chlorine or bromine and n is from 2 to 4.

40. A composition as claimed in claim 3 wherein the agglomeration control compound has a formula selected from the group consisting of

and

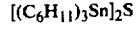

where R is a $C_1$-$C_6$ alkyl group.

41. A composition as claimed in claim 3 wherein the agglomeration control compound is a non-gaseous alpha olefin.

42. A composition as claimed in claim 41 wherein the agglomeration control compound is 1-eicosene.

43. An improved catalyst component of the type formed by grinding a titanium trichloride material with an effective amount of an electron pair donor compound for improving the stereospecificity or stereospecificity and activity of the catalyst component, said component having a tendency to agglomerate, wherein the improvement comprises making an essentially agglomeration-free finely divided component by performing said grinding in the presence of an effective amount of an agglomeration control compound for substantially preventing agglomeration in the catalyst component, wherein the agglomeration control compound is a halide salt of a Group IA metal.

44. A composition as claimed in claim 43 wherein the agglomeration control compound is selected from the group consisting of sodium bromide and sodium chloride.

45. A composition as claimed in claim 43 wherein said electron pair donor compound is benzophenone and said agglomeration control compound is sodium bromide.

46. A composition as claimed in claim 43 wherein said electron pair donor compound is triphenylphosphine oxide and said agglomeration control compound is sodium bromide.

47. An improved catalyst component of the type formed by grinding a titanium trichloride material with an effective amount of an electron pair donor compound for improving the stereospecificity or stereospecificity and activity of the catalyst component, said component having a tendency to agglomerate, wherein the improvement comprises making an essentially agglomeration-free finely divided component by performing said grinding in the presence of an effective amount of an agglomeration control compound for substantially preventing agglomeration in the catalyst component, wherein the agglomeration control compound is selected from the group consisting of the alkali metal salts of benzene sulfonic acid and the $C_1$-$C_{20}$ alkyl sulfonic acids.

48. A composition as claimed in claim 47 wherein the titanium trichloride material is formed by reducing titanium tetrachloride with aluminum.

49. A composition as claimed in claim 47 wherein the agglomeration control compound is the sodium salt of benzene sulfonic acid.

50. A composition as claimed in claim 49 wherein the titanium trichloride material is formed by reducing titanium tetrachloride with aluminum.

51. An improved catalyst component of the type formed by grinding a titanium trichloride material with an effective amount of an electron pair donor compound for improving the stereospecificity or stereospecificity and activity of the catalyst component, said component having a tendency to agglomerate, wherein the improvement comprises making an essentially agglomeration-free finely divided component by performing said grinding in the presence of an effective amount of an agglomeration control compound for substantially preventing agglomeration in the catalyst component, wherein the agglomeration control compound is selected from the group consisting of copper stearate and zinc stearate.

52. A composition as claimed in claim 51 wherein the titanium trichloride material is formed by reducing titanium tetrachloride with aluminum.

53. An improved catalyst component of the type formed by grinding a titanium trichloride material with an effective amount of an electron pair donor compound for improving the stereospecificity or stereospecificity and acitivity of the catalyst component, said component having a tendency to agglomerate, wherein the improvement comprises making an essentially agglomeration-free finely divided component by performing said grinding the presence of an effective amount of an agglomeration control compound for substantially preventing agglomeration in the catalyst component, wherein the agglomeration control compound is a quaternary ammonium salt of the general formula $R_4N^+X^-$ where $R_4$ is hydrogen, alkyl or aryl and X is halide or sulfate.

54. A composition as claimed in claim 53 wherein the titanium trichloride material is formed by reducing titanium tetrachloride with aluminum.

55. A composition as claimed in claim 53 wherein the agglomeration control compound is a $C_1$–$C_4$ trialkylamine hydrochloride, hydrobromide, or hydroiodide.

56. A composition as claimed in claim 55 wherein the titanium trichloride material is formed by reducing titanium tetrachloride with aluminum.

57. A composition as claimed in claim 55 wherein the agglomeration control compound is triethylamine hydrochloride.

58. A composition as claimed in claim 57 wherein the titanium trichloride material is formed by reducing titanium tetrachloride with aluminum.

59. An improved catalyst component of the type formed by grinding a titanium trichloride material with an effective amount of an electron pair donor compound for improving the stereospecificity or stereospecificity and activity of the catalyst component, said component having a tendency to agglomerate, wherein the improvement comprises making an essentially agglomeration-free finely divided component by performing said grinding in the presence of an effective amount of an agglomeration control compound for substantially preventing agglomeration in the catalyst component, wherein the agglomeration control compound is the water-soluble ammonium salt of an amido polyphosphonate formed by the dry vapor phase reaction of $P_2O_5$ with anhydrous ammonia.

60. A composition as claimed in claim 59 wherein the titanium trichloride material is formed by reducing titanium tetrachloride with aluminum.

61. An improved catalyst component of the type formed by grinding a titanium trichloride material with an effective amount of an electron pair donor compound for improving the stereospecificity or stereospecificity and activity of the catalyst component, said component having a tendency to agglomerate, wherein the improvement comprises making an essentially agglomeration-free finely divided component by performing said grinding in the presence of an effective amount of an agglomeration control compound for substantially preventing agglomeration in the catalyst component, wherein the agglomeration control compound is an alkali, alkaline earth or a copper, iron or zinc salt of an aliphatic tricarboxylic acid.

62. A composition as claimed in claim 61 wherein the titanium trichloride material is formed by reducing titanium tetrachloride with aluminum.

63. A composition as claimed in claim 61 wherein the agglomeration control compound is selected from the group consisting of calcium citrate and ferric ammonium citrate.

64. A composition as claimed in claim 61 wherein the titanium trichloride material is formed by reducing titanium tetrachloride with aluminum.

65. An improved catalyst component of the type formed by grinding a titanium trichloride material with an effective amount of an electron pair donor compound for improving the stereospecificity or stereospecificity and activity of the catalyst component, said component having a tendency to agglomerate, wherein the improvement comprises making an essentially agglomeration-free finely divided component by performing said grinding in the presence of an effective amount of an agglomeration control compound for substantially preventing agglomeration in the catalyst component, wherein the agglomeration control compound is an alkyl alkali metal sulfate.

66. A composition as claimed in claim 65 wherein the titanium trichloride material is formed by reducing titanium tetrachloride with aluminum.

67. A composition as claimed in claim 65 wherein the agglomeration control compound is dodecyl sodium sulfate.

68. A composition as claimed in claim 67 wherein the titanium trichloride material is formed by reducing titanium tetrachloride with aluminum.

69. An improved catalyst component of the type formed by grinding a titanium trichloride material with an effective amount of an electron pair donor compound for improving the stereospecificity or stereospecificity and activity of the catalyst component, said component having a tendency to agglomerate, wherein the improvement comprises making an essentially agglomeration-free finely divided component by performing said grinding in the presence of an effective amount of an agglomeration control compound for substantially preventing agglomeration in the catalyst component, wherein the agglomeration control compound is an alkaline earth metal titanate.

70. A composition as claimed in claim 69 wherein the titanium trichloride material is formed by reducing titanium tetrachloride with aluminum.

71. A composition as claimed in claim 69 wherein the agglomeration control compound is calcium titanate.

72. A composition as claimed in claim 71 wherein the titanium trichloride material is formed by reducing titanium tetrachloride with aluminum.

73. An improved catalyst component of the type formed by grinding a titanium trichloride material with an effective amount of an electron pair donor compound for improving the stereospecificity or stereospecificity and activity of the catalyst component, said component having a tendency to agglomerate, wherein the improvement comprises making an essentially agglomeration-free finely divided component by performing said grinding in the presence of an effective amount of an agglomeration control compound for substantially preventing agglomeration in the catalyst component, wherein the agglomeration control compound is a non-gaseous halogen.

74. A composition as claimed in claim 73 wherein the titanium trichloride material is formed by reducing titanium tetrachloride with aluminum.

75. A composition as claimed in claim 73 wherein the agglomeration control compound is iodine.

76. A composition as claimed in claim 75 wherein the titanium trichloride material is formed by reducing titanium tetrachloride with aluminum.

77. An improved catalyst component of the type formed by grinding a titanium trichloride material with an effective amount of an electron pair donor compound for improving the stereospecificity or stereospecificity and activity of the catalyst component said component having a tendency to agglomerate, wherein the improvement comprises making an essentially agglomeration-free finely divided component by performing said grinding in the presence of an effective amount of an agglomeration control compound for substantially preventing agglomeration in the catalyst component.

78. A composition as claimed in claim 77 wherein the titanium trichloride material is selected from the group consisting of material formed by: (a) reduction of titanium tetrachloride with a metal; (b) reduction of titanium tetrachloride with hydrogen; (c) reduction of titanium tetrachloride with an organometallic compound and (d) grinding titanium trichloride and a halide of a Group III metal.

79. A composition as claimed in claim 77 wherein the titanium trichloride material is formed by reducing titanium tetrachloride with aluminum.

80. A composition as claimed in claim 77 wherein the electron pair donor compound is present at from about 2% to about 15% by weight of the titanium trichloride material.

81. A composition as claimed in claim 80 wherein the titanium trichloride material is formed by reducing titanium tetrachloride with aluminum.

82. A composition as claimed in claim 77 wherein the electron pair donor compound is present at from about 2.5% to about 10% by weight of the titanium trichloride material.

83. A composition as claimed in claim 82 wherein the titanium trichloride material is formed by reducing titanium tetrachloride with aluminum.

84. A composition as claimed in claim 77 wherein the agglomeration control compound is a compound which modifies the mutual forces of interaction between particles in the composition.

85. A composition as claimed in claim 84 wherein the titanium trichloride material is formed by reducing titanium tetrachloride with aluminum.

86. A composition as claimed in claim 84 wherein the agglomeration control compound is an ionic compound selected from the group consisting of: ionic salts of Group IA, Group IIA and copper, iron or zinc; quaternary ammonium salts of the formula $R_4N^+X^-$ where $R_4$ is hydrogen, alkyl, or aryl and X is halide or sulfate; ionic surface active agents; finely divided, water-soluble ammonium salt of an amido polyphosphonate formed by the dry vapor phase reaction of $P_2O_5$ and anhydrous ammonia; alkaline earth metal titanates; and non-gaseous halogens.

87. A composition as claimed in claim 86 wherein the titanium trichloride material is formed by reducing titanium tetrachloride with aluminum.

88. A composition as claimed in claim 77 wherein the amount of agglomeration control compound which is effective in preventing agglomeration ranges from about 0.1% to about 5%, by weight based on the weight of the electron pair donor compound.

89. A composition as claimed in claim 88 wherein the titanium trichloride material is formed by reducing titanium tetrachloride with aluminum.

90. A composition as claimed in claim 77 wherein the amount of agglomeration control compound which is effective in preventing agglomeration ranges from about 0.6 to about 3.0% by weight based on the weight of the electron pair donor compound.

91. A composition as claimed in claim 90 wherein the titanium trichloride material is formed by reducing titanium tetrachloride with aluminum.

92. A composition as claimed in claim 77 wherein the agglomeration control compound is an ionic salt of a Group IA metal.

93. A composition as claimed in claim 92 wherein the titanium trichloride material is formed by reducing titanium tetrachloride with aluminum.

94. A composition as claimed in claim 77 wherein the agglomeration control compound is an ionic salt of a Group IIA metal.

95. A composition as claimed in claim 77 wherein the titanium trichloride material is formed by reducing titanium tetrachloride with aluminum.

96. A composition as claimed in claim 77 wherein the agglomeration control compound is an ionic salt of copper, iron or zinc.

97. A composition as claimed in claim 96 wherein the titanium trichloride material is formed by reducing titanium tetrachloride with aluminum.

98. A composition as claimed in claim 77 wherein the agglomeration control compound is an alkaline earth metal phosphate.

99. A composition as claimed in claim 98 wherein the titanium trichloride material is formed by reducing titanium tetrachloride with aluminum.

100. A composition as claimed in claim 98 wherein the agglomeration control compound is calcium phosphate, tribasic.

101. A composition as claimed in claim 100 wherein the titanium trichloride material is formed by reducing titanium tetrachloride with aluminum.

102. A catalyst composition which comprises the catalyst component of claim 77 and an alkyl aluminum compound.

103. A catalyst composition which comprises the catalyst component of claim 1 and an alkyl aluminum compound.

* * * * *